United States Patent [19]

DeLand et al.

[11] Patent Number: 4,691,943
[45] Date of Patent: Sep. 8, 1987

[54] QUICK CONNECT FLUID FITTING ASSEMBLY

[75] Inventors: Daniel L. DeLand, Millington; Leon F. LaVene, Durand, both of Mich.

[73] Assignee: Schmelzer Corporation, Flint, Mich.

[21] Appl. No.: 897,608

[22] Filed: Aug. 18, 1986

Related U.S. Application Data

[63] Continuation-in-part of Ser. No. 726,839, Apr. 24, 1985, abandoned.

[51] Int. Cl.$^4$ ............................................. F16L 21/00
[52] U.S. Cl. ..................................... 285/315; 285/308
[58] Field of Search ................. 285/33, 307, 308, 315, 285/319, DIG. 22, DIG. 25; 137/614.04

[56] References Cited

U.S. PATENT DOCUMENTS

| | | |
|---|---|---|
| 921,691 | 5/1909 | Friday . |
| 1,542,421 | 4/1922 | Strongson . |
| 2,069,377 | 2/1937 | Matthiessen, Jr. ............... 285/315 X |
| 2,111,956 | 3/1938 | Baldwin ........................... 285/315 X |
| 2,123,889 | 4/1937 | Gleason . |
| 2,441,344 | 5/1945 | Bosworth . |
| 2,465,197 | 3/1949 | Chatham .............................. 285/33 |
| 2,479,960 | 8/1949 | Osborn ............................ 285/315 X |
| 3,092,404 | 9/1957 | MacWilliam . |
| 3,314,696 | 2/1964 | Ferguson et al. . |
| 3,447,819 | 6/1969 | Borsum et al. .................. 285/315 X |
| 3,450,424 | 12/1964 | Calisher . |
| 3,453,005 | 4/1968 | Foults . |
| 3,527,485 | 7/1968 | Goward et al. . |
| 3,534,988 | 11/1968 | Lindsey . |
| 3,538,940 | 11/1970 | Graham . |
| 3,569,903 | 8/1969 | Brishka . |
| 3,574,359 | 4/1971 | Klein . |
| 3,584,902 | 6/1971 | Vyse . |
| 3,628,768 | 12/1971 | Hutt . |
| 3,672,708 | 6/1972 | Zemberry ........................... 285/315 |
| 3,711,125 | 1/1973 | Dehar . |
| 3,718,350 | 2/1973 | Klein . |
| 3,724,882 | 4/1973 | Dehar . |
| 3,826,523 | 7/1974 | Eschbaugh . |
| 3,929,356 | 12/1975 | DeVincent et al. . |
| 3,929,357 | 12/1975 | DeVincent et al. . |
| 3,933,378 | 1/1976 | Sandford et al. . |
| 3,980,324 | 9/1976 | Bouteille et al. . |
| 4,005,883 | 2/1977 | Guest . |
| 4,009,896 | 3/1977 | Brewer . |
| 4,080,752 | 3/1978 | Burge . |
| 4,111,464 | 9/1978 | Asano . |
| 4,123,089 | 10/1978 | Viero . |
| 4,123,091 | 10/1978 | Consentino . |
| 4,128,264 | 12/1978 | Oldford . |
| 4,135,745 | 1/1979 | Dehar ................................ 285/319 |
| 4,214,586 | 7/1980 | Mericle . |
| 4,219,222 | 8/1980 | Brusadin . |
| 4,244,608 | 1/1981 | Stuemky . |
| 4,266,814 | 5/1981 | Gallagher . |
| 4,288,113 | 9/1981 | Saulnier ........................ 285/308 X |
| 4,423,892 | 1/1984 | Bartholomew . |

FOREIGN PATENT DOCUMENTS

| | | | |
|---|---|---|---|
| 112631 | 12/1968 | Denmark ........................... 285/315 |
| 2307154 | 8/1974 | Fed. Rep. of Germany . |
| 2611233 | 9/1977 | Fed. Rep. of Germany . |
| 2622269 | 11/1977 | Fed. Rep. of Germany . |
| 46-16478 | 5/1971 | Japan ................................. 285/315 |
| 718350 | 11/1954 | United Kingdom . |
| 1030535 | 5/1966 | United Kingdom . |
| 1145667 | 3/1969 | United Kingdom . |

OTHER PUBLICATIONS

Snap-Tite Catalog, Union City, Pa. 7/1968, "Quick Disconnect Couplings".

Primary Examiner—A. Michael Chambers
Assistant Examiner—John C. Fox
Attorney, Agent, or Firm—Harness, Dickey & Pierce

[57] ABSTRACT

A quick-connect fitting or coupling assembly is adapted for releasably connecting and disconnecting a pair of fluid conduits in fluid communication with one another. The assembly includes a socket on one of the fluid conduits for receiving the other fluid conduit inserted longitudinally therein into an interlocking engagement with a resilient barb or finger member on a retainer member disposed within the socket. A removal member is selectively slidably movable in the socket for deflecting the barb or finger member out of such interlocking engagement in order to remove the previously inserted fluid conduit. The assembly also preferably includes lateral support members for laterally supporting the fluid conduits relative to one another and thus strengthening the connection therebetween. The preferred embodiment includes a feature by which the fitting assembly is relatively tamper-resistant.

13 Claims, 6 Drawing Figures

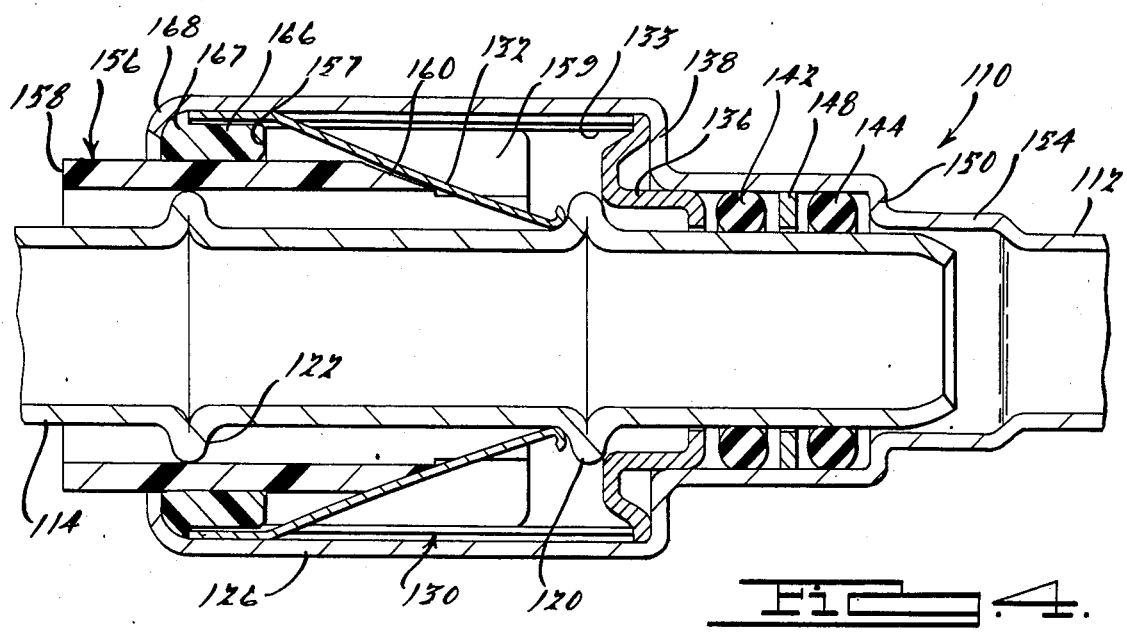
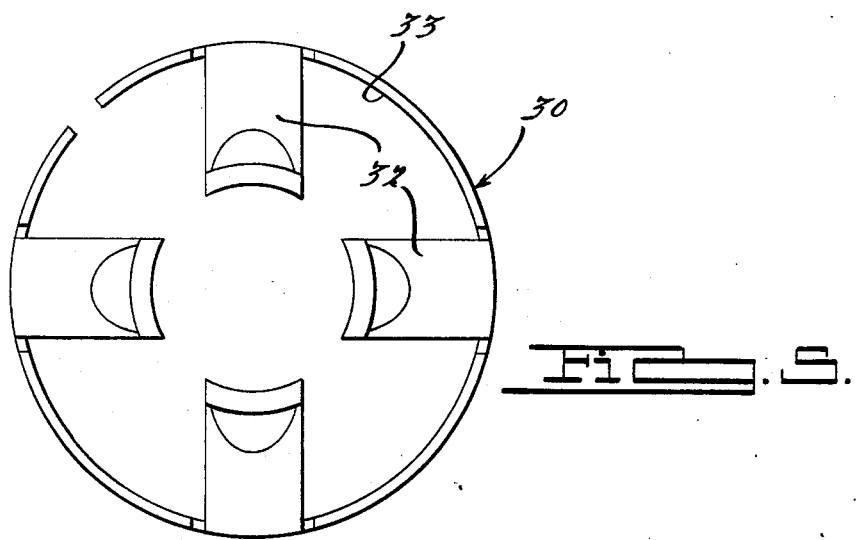
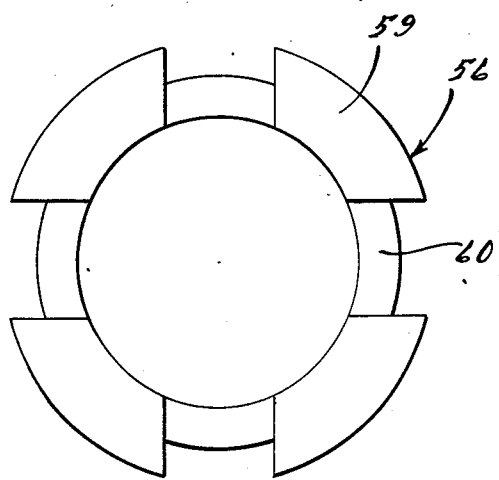

QUICK CONNECT FLUID FITTING ASSEMBLY

BACKGROUND AND SUMMARY OF THE INVENTION

This is a continuation-in-part of copending U.S. patent application, Ser. No. 726,839, filed Apr. 24, 1985 and now abandoned, and assigned to the same assignee as the present invention herein. Such copending application is therefore hereby incorporated by reference herein.

The invention relates generally to fluid conduit fitting or coupling devices. More particularly, the invention relates to fluid conduit fittings or couplings adapted for quickly and conveniently connecting or disconnecting a pair of fluid conduits.

A wide variety of fluid conduit fittings and couplings have been provided in the prior art for connecting conduits in fluid communication with one another. One type of such previously-known couplings includes an external generally U-shaped staple or spring clip that is inserted into generally lateral openings in an assembled fitting or coupling in order to interlockingly connect the components of the assembly to one another. Frequently, however, such staples or clips become misplaced or permanently deformed as a result of repeated assembly and disassembly of the coupling and are therefore rendered unusuable and must be replaced. Additionally, such staples or clips frequently protrude outwardly away from the fitting or coupling assembly where they can snag on, or interfere with, other adjacent components in an apparatus or system. Finally, in high pressure applications, such as staples or clips are often required to be very stiff and are thus difficult to install and remove from the fluid coupling or fitting.

Other prior art fittings or couplings require the use of an external clamp or ring that compresses one of the fluid conduits onto a nipple-like structure and are very time-consuming to install or remove during connection or disconnection of fluid conduits. Like the staples or clips described above, these external clamps or rings often become misplaced or permanently damaged during assembly and disassembly of the fluid conduit joint and therefore must be frequently replaced.

Still other prior art fitting or coupling assemblies include collars or sleeve-like members that are interlockingly interconnectable and disconnectable with one another in order to sealingly connect or disconnect a pair of fluid conduits. Although such fitting or coupling assemblies overcome many of the disadvantages of the prior art devices described above by having the collars or sleeves retained on the fluid conduits even when disconnected, they frequently do not provide adequate lateral support for the fluid conduits being connected to one another and thereby provide a relatively weak connection that is susceptible to leakage or that can result in physical damage to the conduits.

Still other well-known fitting or coupling assemblies include male and female elements on the conduits that are threadably connectable to one another, but are cumbersome and time-consuming to connect or disconnect. These types of couplings are also susceptible to leakage, thereby requiring the application of sealing compounds or tape-type sealants to the threads each time the coupling elements are connected to one another. These types of couplings often cannot be used in confined areas due to the space required to tighten or loosen the threaded connections with a wrench or other tool during connection and disconnection.

Still other prior art fittings include interlockingly connectable threaded collars surrounding the fluid conduits and seals. In addition to being unusable in confined areas, these types of couplings have the disadvantage of being sensitive to installation torque. If such threaded collars are not sufficiently tightened, leakage can result, but excessive torque may cause excessive compression of the seal members, which can result in accelerated deterioration of elastomeric seals.

Still other prior art coupling assemblies incorporate an expandable clip which, when inserted expands inside a threaded nut thereby locking the fluid conduits together. The nut in this type of coupling must be removed to disconnect the coupling. The use of this type of coupling is therefore limited to unconfined areas where there is sufficient space to use wrenches or other such tools during connection and disconnection. A further disadvantage of this coupling is that sealing and latching members are usually loosely assembled around one of the fluid conduits, making them susceptible to being dislodged or lost during shipping or handling prior to coupling and also after disassembly.

Still other prior art couplings include resilient lugs to grip a semi rigid hose in a push-connect assembly. This type of coupling is suited only to applications where fluid pressures are relatively low and a high degree of seal integrity is not required. These types of connectors rely on penetration of the lugs into the surface of the hose to secure the connection. Of necessity, therefore, the hose must be relatively soft and the lugs must be relatively hard. Such push-connect coupling assemblies also suffer from the disadvantage of the hose being susceptible to damage during connection and disconnection. As a result, this type of connection tends to be unreliable and is unsuited in applications where repeated connections and disconnections are anticipated, as well as in applications where relative rotation of the fluid conduits can result in the hard lugs cutting through the relatively soft hose, thus requiring removal of the damaged hose end prior to reconnection.

The above-mentioned push-connect fittings are also not well suited for connection of metal conduits as the lugs are unable to penetrate the hard tube. In addition, an abutment member is relied upon to limit the inward deflection of the lugs, and therefore such fittings are not adaptable for use with a conduit having a protuberance adapted for engagement by the lugs. Of necessity, there must be sufficient clearance for the protuberance to pass between the lugs and the abutment, thus negating the deflection-limiting effect of the abutment.

Some push-connect couplings are provided with a clip having multiple lugs or fingers for engaging a protuberance on a second fluid conduit. It is also common to provide a removal sleeve member that, when pushed inward, expands the lugs or fingers in order to allow the coupling to be disconnected. Generally, such fittings lack adequate means to limit the inward stroke of the removal sleeve in order to avoid excessive deflection of, and possible damage to, the lugs or fingers and to avoid the potential for the removal sleeve to become stuck in the inward position. These couplings also lack adequate means to laterally guide the removal sleeve during inward movement, thus making lateral movement possible. Such lateral movement, which can be caused by off-center application of assembly force, can lead to mispositioning of the removal sleeve and resultant sticking in the inward position. Many of these couplings also lack a means to return the removal sleeve to the outward position after disassembly, while others rely on auxiliary springs to perform this function.

It is common in couplings of the push-connect type to provide a retainer for the seal or seals to prevent them from being forced out of the gland by fluid pressure with the conduit. In many couplings, the outward force on the O-rings caused by such pressure pushes against the retainer, which in turn pushes against the protuberance on the second fluid conduit and thus transmits the load into the latch mechanism. While it is also common to install the retainer into the gland by means of a press fit, the force from the O-ring can dislodge the retainer, especially where thin-walled housings, which expand under pressure, are used. Once dislodged, this type of coupling can leak or burst.

Accordingly, it is one of the objects of the present invention to provide an improved fitting or coupling assembly especially adapted for quickly, conveniently and releasably connecting a pair of fluid conduits in fluid communication with one another.

Another object of the present invention is to provide a quick-connect fitting or coupling assembly that does not include separate or loose components that can be misplaced or damaged during repeated connection and disconnection of a pair of fluid conduits.

Still another object of the present invention is to provide a quick-connect fitting or coupling assembly that incorporates a release mechanism with limited inward movement of a removal sleeve to prevent excessive deflection of the fingers of a latch clip or retainer member or other internal components, and that provides internal guidance and lateral support to prevent misalignment and sticking of the various components.

A further object of the present invention is to provide a means to automatically return a removal sleeve or other release member to the outward position without the use of auxiliary springs.

A still further object of the present invention is to provide an O-ring retainer which need not be pressed in place and does not transmit O-ring forces into the second fluid conduit.

In accordance with the present invention, a quick-connect fitting assembly for releasably connecting a pair of fluid conduits in fluid communication with one another includes a socket on one of the fluid conduits for receiving the other fluid conduit inserted longitudinally inwardly into the socket. The inserted fluid conduit has a generally laterally-extending protuberance thereon, and a retainer member or latch clip within the fluid socket includes one or more resilient barb members that are resiliently deflectable into a longitudinally interlocking engagement with the protuberance on the inserted fluid conduit. Preferably, a release or removal member is longitudinally insertable into the socket and selectively movable therein in order to engage and resiliently deflect the barb member or members laterally out of interlocking engagement with the protuberance on the inserted conduit, thereby allowing the inserted conduit to be withdrawn from the socket.

Preferably, the above-mentioned resilient barbs also function to return the release or removal member to the outward position after the inserted fluid conduit is withdrawn, and thus inward loads on the removal member are removed. Lateral support is preferably provided both at the outward end of the fitting assembly and at the inner end of the inserted fluid conduit relative to the socket and the remainder of the fitting assembly. In a preferred embodiment, the above mentioned release or removal member contributes to such lateral support and also functions as a dust cap for substantially preventing foreign material from entering the socket and inhibiting proper operation of the fitting assembly.

In the preferred embodiment of the invention, the removal or release mechanism includes a generally sleeve-like removal member extending at least partially into the socket, with a collar member disposed between the socket and the sleeve-like removal member. Such collar member is located at a longitudinal position generally surrounding both the removal member and a second laterally-extending protuberance on the inserted conduit so that the sleeve-like removal member and the collar member laterally support the inserted fluid conduit. The removal member preferably includes legs which extend between the fingers of the retainer member, bothof which guide and limit the inward movement of the removal member. The legs of the removal member also preferably form a shoulder which abuts the collar member to retain the removal member within the socket. The latch clip or retainer member in such preferred embodiment includes a barb member for interlockingly engaging the first protuberance on the inserted fluid conduit.

Also in the preferred embodiment, the outer end of the removal member is substantially flush with the end of the surrounding collar member. Thus a tool is required to urge the release member inward, thus inhibiting the inadvertent or unauthorized disconnection of the fluid conduits from one another. In other embodiments, however, the removal member extends beyond the collar member, making it possible to disconnect the fluid conduits from one another without the use of tools.

In the preferred embodiment, the retainer member or latch clip is provided with legs circumferentially located between the resilient barb members. These legs abut the O-ring retainer so that any forces generated by fluid pressure against the O-ring seal or seals are transmitted through the retainer to the latch clip legs, to the collar member, and ultimately to the housing. Only the forces applied to the second fluid conduit, and not to the seals, are transmitted through the barb members or latching fingers of the retainer member, thereby increasing the capability of the coupling to withstand high pressures.

Additional objects, advantages and features of the present invention will become apparent from the folowing description and the appended claims, taken in conjunction with the accompanying drawings.

BRIEF DESCRIPTION OF THE DRAWINGS

FIG. 4 is a longitudinal cross-sectional view similar to FIG. 1, but illustrating an alternate embodiment of the present invention wherein the quick connect fluid FIG. 5 is an end view of a preferred retainer member or latch clip of the present invention.

FIG. 6 is an end view of a preferred removal or release member of the present invention.

DETAILED DESCRIPTION OF THE PREFERRED EMBODIMENTS

Figure 1:
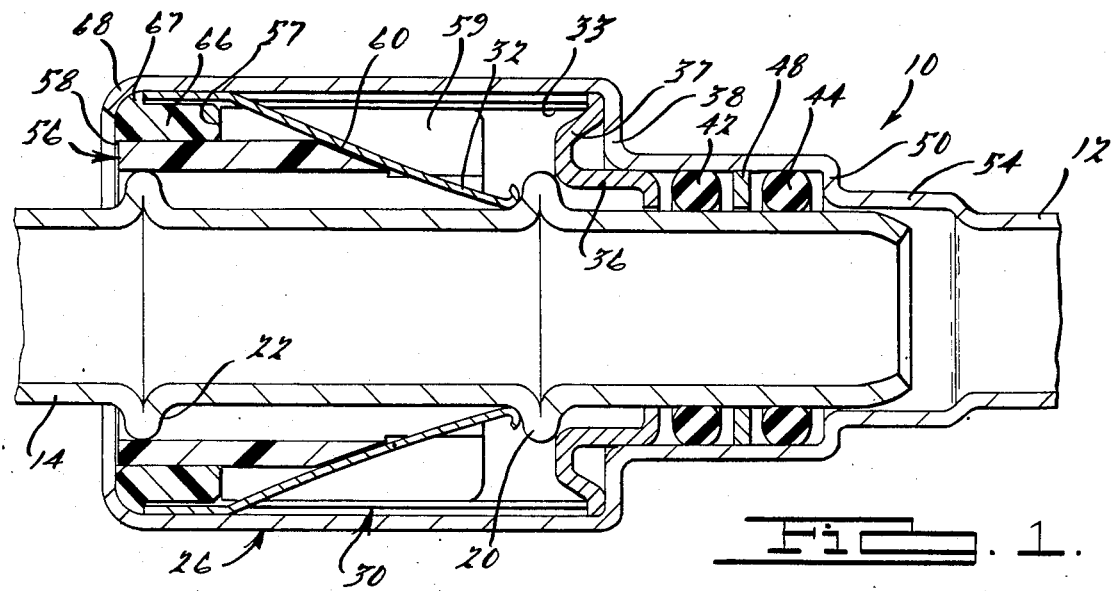
FIG. 1 is a longitudinal cross-sectional view of one preferred embodiment of a quick-connect fitting assembly according to the present invention.

FIGS. 1 through 6 illustrate various exemplary embodiments of the present invention in quick-connect fitting assemblies for releasably connecting a pair of cylindrical fluid conduits to one another in fluid communication therebetween. As will become apparent to one skilled in the art from the following discussion, the principles employed in the illustrated embodiments of the quick-connect fitting assembly according to the present invention are also applicable to fluid systems and fluid conduits of shapes, configurations or types other than those shown for purposes of illustration in the drawings.

Figure 2:
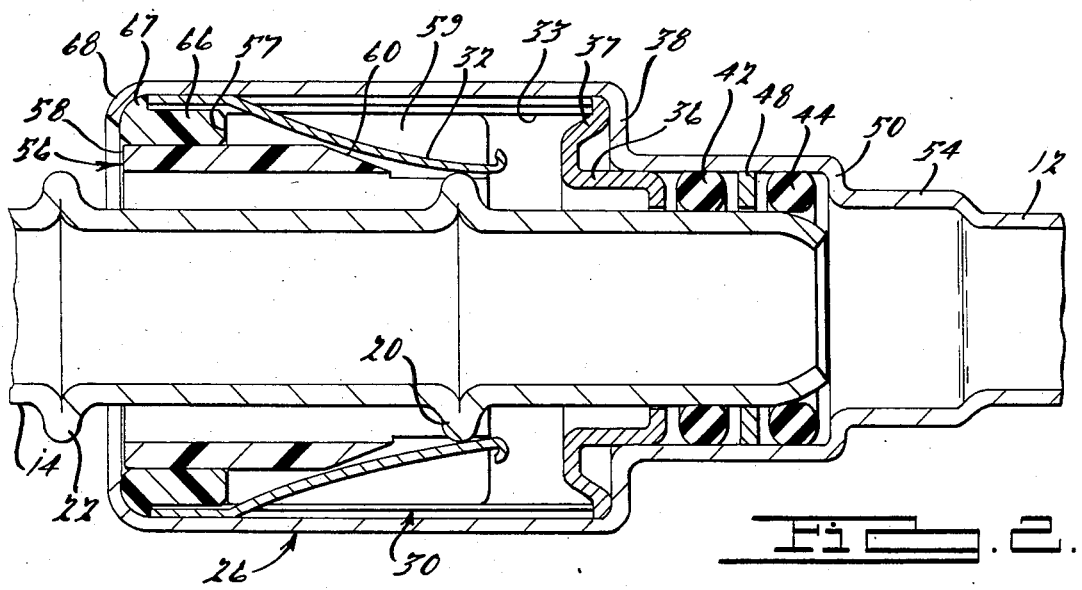
FIG. 2 is a longitudinal cross-sectional view similar to FIG. 1, but showing one of the fluid conduits being inserted into the fitting assembly.
Figure 3:
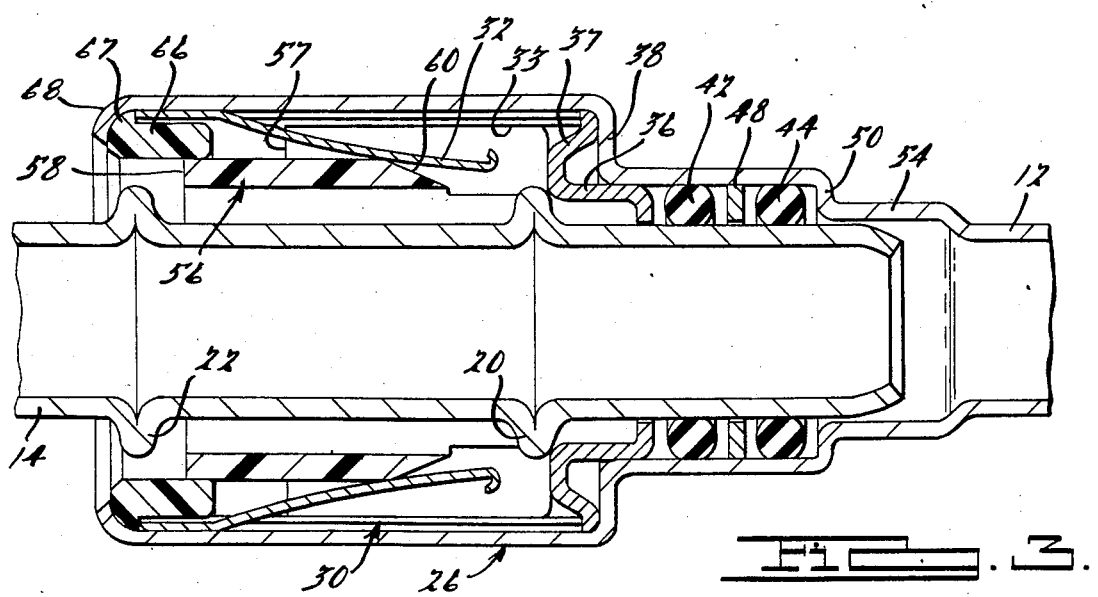
FIG. 3 is a longitudinal cross-sectional view similar to FIGS. 1 and 2, but showing the previously inserted fluid conduit being withdrawn from the fitting assembly.

Referring to FIGS. 1 through 3, a preferred quick-connect fitting assembly 10 is provided in accordance with the present invention for releasably connecting a first fluid conduit 12 and a second fluid conduit 14 to one another in fluid communication therebetween.

The second fluid conduit 14, which preferably includes first and second generally laterally-extending protuberances 20 and 22, is longitudinally insertable into a socket member or assembly 26 that is either integrally formed on the first fluid conduit 12 or sealingly secured thereto. The socket member or assembly 26 includes a preferred resilient or spring-like clip or retainer member 30 disposed therein and having one or more resilient fingers or barbs 32 extending inwardly therefrom in a generally longitudinal and lateral direction and one or more clip or retainer legs 33 circumferentially disposed between the fingers 32 and extending longitudinally within the socket member 26.

When the second fluid conduit 14 is longitudinally inserted into the socket member 26 as shown in FIG. 2, the first protuberance 20 engages the resilient fingers 32, and causes it to resiliently deflect in a generally outward direction as the first protuberance 20 passes longitudinally thereby. Once the first protuberance 20 longitudinally passes and clears the fingers 32, the fingers 32 resiliently retract inwardly into a longitudinally interlocking engagement with the first protuberance 20. Thus, in its fully inserted position, the first protuberance 20 on the second fluid conduit 14 is longitudinally restrained between the first barb or finger member 32 and a retainer or stop member 36 disposed in a retaining and abutting engagement with a stepped portion 38 of the socket member 26. One or more sealing members, such as sealing members 42 and 44, are sealingly compressed between the inner surface of the socket member 26 and the outer surface of the second fluid conduit 14 in order to provide fluid sealing between the first and second fluid conduits 12 and 14, respectively.

Preferably, the sealing members 42 and 44, are separated and maintained in their proper positions by an inner collar member or spacer 48 and are longitudinally retained within the socket member 26 between the retainer or stop member 36 and a stepped portion 50 of the socket member 26. A reduced diameter portion 54 of the socket member 26 provides lateral support for the second fluid conduit 14 at a longitudinal position generally adjacent its inner end, thereby strengthening the interconnection therebetween. Although such inner lateral support is provided primarily by the reduced diameter portion 54, the inner collar member 48 and retainer or stop member 36 contribute somewhat to the lateral support of the second fluid conduit 14.

The retainer or stop member 36 preferably includes a generally conical portion 37, which serves to guide the end of the clip or retainer legs 33 into position adjacent the inner surface of the largest diameter portion of the socket member 26. The conical surface 37 also prevents laterally inward movement of the clip or retainer legs 33, both during and after assembly, thereby preventing an interference with one or more legs 59 of a removal or release member 56, which are discussed in more detail below.

The fitting assembly 10 also includes a removal or release member 56, which is generally a sleeve-like configuration and extends at least partially into the socket member 26.

The removal or release member 56 is longitudinally movable in an inward direction to engage and urge the fingers 32 into resiliently and outwardly deflected positions clear of the first protuberance 20 on the second fluid conduit 14. When the fingers 32 are resiliently deflected into such positions, as shown in FIG. 3, the second fluid conduit 14 can be longitudinally withdrawn from the socket member 26, thereby disconnecting the first fluid conduit 12 and the second fluid conduit 14 from one another.

The removal or release member 56 preferably includes one or more generally longitudinally extending legs 59 that limit the longitudinally inward movement of the removal member 56 by abutting the stop member 36 at the limit of their inward movement, as shown in FIG. 3, thus preventing excessive deflection of fingers 32. The legs 59 also preferably provide guidance and lateral support for the removal member 56 by way of sliding contact with the inner surface of the clip or retainer legs 33 of the clip or retainer member 30. The removal member 56 also preferably includes shoulders 57 on each leg 59, which abut the longitudinally inward surface of a collar member 66 (described below), for limiting the longitudinally outward movement of the removal member 56. The removal member 56 also preferably includes a ramp portion 60 for engaging and resiliently deflecting the fingers 32 as the removal member 56 is moved longitudinally inward.

The ramp portion 60 on the release or removal member 56 is preferably generally adjacent to the fingers 32 when the coupling assembly 10 is in its assembled or connected condition and therefore provides longitudinal support for the fingers 32 in order to resist longitudinal outward movement of the second fluid conduit 14 relative to the socket member 26. Furthermore, when the removal member 56 is moved longitudinally inwardly to engage and resiliently deflect the fingers 32 and then released, the fingers 32 resiliently bias the removal member 56 back to its normal longitudinal position within the socket member 26.

The removal member 56 also preferably includes an external bearing surface 58 that is abuttable by a tool for selectively urging the removal member 56 in a longitudinally inward direction in order to remove the second fluid conduit 14 from the socket member 26.

The socket member or assembly 26 also preferably includes the above-mentioned collar member 66 disposed generally adjacent its longitudinally outward end and retained therein between a socket flange portion 68 and the longitudinally outermost end of the clip or retainer member 30 by means of a shoulder portion 67 of the retainer member 30 retainingly engaging the collar member 66.

The collar member 66 is positioned laterally between the removal member 56 and the socket member 26 at a longitudinal position wherein it generally surrounds the second protuberance 22 on the second fluid conduit 14 so that the collar member 66 and the removal member 56 provide lateral support for the second fluid conduit 14 generally at or near the longitudinally outer end of the socket member 26. This lateral support, coupled with the lateral support provided by the reduced diameter portion 54 at the opposite longitudinal end of the socket member 26, provide improved strength and stability of the connection between the first and second fluid conduits 12 and 14, respectively, over that provided by prior art quick-connect fluid assemblies. Such strength and stability also contribute greatly to substantially preventing leakage between the first and second fluid conduits 12 and 14, respectively.

In addition to the above discussed lateral support provided at the longitudinally outer end of the socket member 26 by the collar member 66, the removal member 56, and the second protuberance 22, the engagement between the surface of the removal member 56 and the second protuberance 22, as well as the engagement between the outer surface of the removal member 56 and the socket flange 68, allow the removal member 56 to effectively serve as a "dust cap" that substantially prevents the entry of dust or other foreign material into the socket member 26. Thus, the preferred removal member 56 serves at least three functions, namely the conduit removal and lateral support functions described above, and the resistance to the entry of such foreign material.

During initial assembly of the quick-connect fitting assembly 10, the sealing members 42 and 44 and the spacer 48 are first inserted into the socket member 26 and retained therein by the retainer or stop member 36. Next, the clip or retainer member 30, which can be stamped out of sheet spring material, for example, is inserted into the socket member 26 in a longitudinal and lateral engagement with the retainer or stop member 36. The removal member 56 is then inserted into the socket member 26 inside and in alignment with the clip or retainer member 30. The collar member 66 is then inserted into the socket member 26 adjacent the clip or retainer member 30 and removal member 56, with the shoulders 67 abutting the clip or retainer member 30, and the socket flange 68 is swaged, spun, or otherwise formed into a laterally inwardly-extending configuration in order to engage and retain the collar member 66 and the clip or retainer member 30 within the socket member 26, as shown in the drawings. At this point in the assembly operation, the quick-connect fitting assembly 10 is ready for insertion of the second fluid conduit 14 and for subsequent connection or disconnection of the first and second fluid conduits 12 and 14, respectively.

FIG. 4 illustrates another of the preferred embodiments of the present invention, in which a quick-connect fitting assembly 110 is similar in many respects to quick-connect fitting assembly 10 of FIGS. 1 through 3 except that the preferred fitting assembly 110 includes an extended end 158 on the removal member 156, thus providing a means to grip the removal member 156 and disconnect the coupling 110 without the use of tools.

Because of the many similarities in both configuration and function between the fitting assembly 110 of FIG. 4 and the fitting assembly 10 of FIGS. 1 through 3, various elements of the fitting assembly 110 that are similar in configuration or function to those of the fitting assembly 10 are indicated by reference numerals that are 100 numerals higher than the corresponding elements of the fitting assembly 10. Also because of the many similarities in both configuration and function between the fitting assembly 10 and the fitting assembly 110, the description of such similar or corresponding elements or features is not repeated herein in connection with the fitting assembly 110.

FIG. 5 illustrates an end view of the clip or retainer member 30, which is preferably generally circular or cylindrical, with the fingers 32 spaced around its circumference and extending inwardly. The legs 33 also constitute segments of the circumference of the clip or retainer member 30 and are located generally circumferentially between the fingers 32.

FIG. 6 illustrates an end view of the removal member 56, which is generally circular or cylindrical, with the ramp portions 60 spaced about the circumference and the legs 59 located between the ramp portions 60.

The foregoing discussion discloses and describes exemplary embodiments of the present invention. One skilled in the art will readily recognize from such discussion, and from the accompanying drawings and claims, that various changes, modifications and variations may be made therein without departing from the spirit and scope of the invention as defined in the following claims.

We claim:

1. A quick-connect fitting assembly for releasably connecting a pair of fluid conduits to one another for fluid communication therebetween, said quick-connect fitting assembly comprising:
   socket means on a first of the fluid conduits for receiving a second of said fluid conduits inserted longitudinally inwardly into said socket means, said second fluid conduit having a laterally-extending protuberance thereon;
   retainer means within said socket means for releasably retaining said second fluid conduit within said socket means, said retainer means including one or more resilient finger members disposed within said socket means and being resiliently deflectable into a longitudinally interlocking engagement with said protuberance as said second fluid conduit is inserted into said socket means;
   removal means longitudinally insertable into said socket means and being selectively movable longitudinally inwardly from a predetermined longitudinal position therein for urging said finger members out of said interlocking engagement with said protuberance, said removal means including longitudinally-extending legs thereon, means for limiting the longitudinal movement of said removal means within said socket means, and lateral guidance means for substantially preventing lateral movement of said removal means as said removal means is moved longitudinally within said socket means, said lateral guidance means including circular segments on said retainer means disposed circumferentially between said finger members, said longitudinally-extending legs on said removal means being disposed adjacent said cylindrical segments of said retainer member for slidable contact therewith; and lateral support means for laterally supporting said second fluid conduit relative to said socket means at longitudinal position outward of said finger member.

2. A quick-connect fitting assembly according to claim 1, wherein said lateral support means includes a second protuberance on said second fluid conduit extending laterally outwardly in a laterally supporting engagement with said removal means.

3. A quick-connect fitting assembly according to claim 2, wherein said lateral support means further includes a collar member in said socket means, said collar member being disposed between said removal means and said socket means at a longitudinal location generally surrounding said second protuberance with said removal means therebetween.

4. A quick-connect fitting assembly according to claim 3, wherein said means for limiting the longitudinal movement of said removal means includes one or more longitudinally-extending legs on said removal means engageable with said collar member.

5. A quick-connect fitting assembly according to claim 1, wherein said removal means includes a sleeve member disposed between a second protuberance and said socket means, said sleeve member being slidably movable longitudinally on said second fluid conduit into engagement with said finger member.

6. A quick-connect fitting assembly according to claim 1, wherein said removal member is insertable into said socket means to a longitudinal position generally adjacent one or more of said resilient finger members in order to provide longitudinal support therefor for resisting longitudinally outward movement of said second fluid conduit.

7. A quick-connect fitting assembly according to claim 1, further comprising stop means for isolating the forces applied on said quick-connect assembly by a fluid within said fluid conduits from said finger members on said retainer means.

8. A quick-connect fitting assembly according to claim 7, wherein said stop means further includes means for retaining said retainer means at a predetermined longitudinal position within said socket means and means for retaining at least a portion of said retainer means at a predetermined lateral position within said socket means.

9. A quick-connect fitting assembly according to claim 1, further comprising return means for returning said removal means to said predetermined longitudinal position within said socket means after said removal means has been moved longitudinally inwardly therein.

10. A quick-connect fitting assembly according to claim 9, wherein said removal means includes a sloping ramp portion thereon at its longitudinally inward end, said return means including said finger members of said retainer means in engagement with said sloping ramp portion of said removal means in order to resiliently bias said removal means toward said predetermined longitudinal position.

11. A quick-connect fitting assembly for releasably connecting a pair of fluid conduits to one another for fluid communication therebetween, said quick-connect fitting assembly comprising:
socket means on a first of the fluid conduits for receiving a second of said fluid conduits inserted longitudinally inwardly into said socket means, said second fluid conduit having a laterally-extending protuberance thereon;
a collar member in said socket means;
retainer means within said socket means for releasably retaining said second fluid conduit within said socket means, said retainer means including one or more resilient finger members disposed within said socket means and being resiliently deflectable into a longitudinally interlocking engagement with said protuberance as said second fluid conduit is inserted into said socket means;
removal means longitudinally insertable into said socket means and being selectively movable longitudinally inwardly from a predetermined longitudinal position therein for urging said finger members out of said interlocking engagement with said protuberance, said removal means including means for limiting its longitudinal movement within said socket means including one or more longitudinally-extending legs on said removal means engageable with said collar member, and lateral guidance means for substantially preventing lateral movement of said removal means as said removal means is moved longitudinally within said socket means, said lateral guidance means including circular segments on said retainer means disposed circumferentially between said finger members, said longitudinally extending legs being disposed adjacent said cylindrical segments of said retainer member for slidable contact therewith; and
lateral support means for laterally supporting said second fluid conduit relative to said socket means at a longitudinal position outward of said finger member, said lateral support means including a second protuberance on said second fluid conduit extending laterally outwardly in a laterally supporting engagement with said removal means, and said collar member being disposed between said removal means and said socket means at a longitudinal location generally surrounding said second protuberance with said removal means therebetween.

12. A quick-connect fitting assembly for releasably connecting a pair of fluid conduits to one another for fluid communication therebetween, said quick-connect fitting assembly comprising:
socket means on a first of the fluid conduits for receiving a second of said fluid conduits inserted longitudinally inwardly into said socket means, said second fluid conduit having a laterally-extending protuberance thereon;
retainer means within said socket means for releasably retaining said second fluid conduit within said socket means, said retainer means including one or more resilient finger members disposed within said socket means and being resiliently deflectable into a longitudinally interlocking engagement with said protuberance as said second fluid conduit is inserted into said socket means, longitudinally-extending retainer legs on said retainer means, and a stop member within said socket means, said stop member longitudinally engaging said retainer legs of said retainer means in order to retain said retainer means at a predetermined longitudinal position within said socket means, said stop member further having a locating surface thereon engageable with said retainer legs for retaining said retainer means at a predetermined lateral position within said socket means;

removal means longitudinally insertable into said socket means and being selectively movable longitudinally inwardly from a predetermined longitudinal position therein for urging said finger member out of said interlocking engagement with said protuberance, said removal means including means for limiting its longitudinal movement within said socket means; and lateral support means for laterally supporting said second fluid conduit relative to said socket means at a longitudinal position outward of said finger member.

13. A quick-connect fitting assembly according to claim 12, wherein said locating surface comprises a conical surface on said stop member for guiding the ends of said retainer legs into said predetermined lateral position as the quick-connect fitting is assembled.

* * * * *

UNITED STATES PATENT AND TRADEMARK OFFICE
CERTIFICATE OF CORRECTION

PATENT NO. : 4,691,943

DATED : September 8, 1987

INVENTOR(S) : David L. DeLand et al.

It is certified that error appears in the above-identified patent and that said Letters Patent is hereby corrected as shown below:

Title Page under "Foreign Patent Documents", insert --163,947 Germany--.

Title Page under "Foreign Patent Documents", insert --2,360,921 6/1974 West Germany--.

Column 1, line 28, "unusuable" should be --unusable--.

Column 1, line 33, after "such" delete --as--.

Column 4, line 19, "bothof" should be --both of--.

Column 4, lines 51-52, "folowing" should be --following--.

Column 6, line 25, "shownin" should be --shown in--.

Signed and Sealed this

Fifth Day of April, 1988

Attest:

DONALD J. QUIGG

*Attesting Officer*   *Commissioner of Patents and Trademarks*